Oct. 11, 1932.   J. G. TANDBERG   1,881,978
TEMPERATURE CONTROL APPARATUS
Filed Feb. 17, 1931
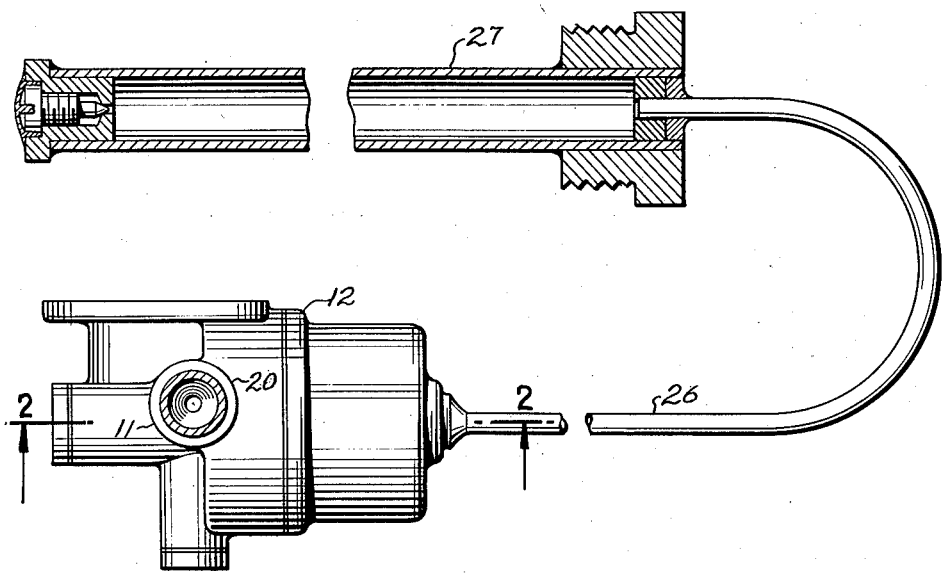
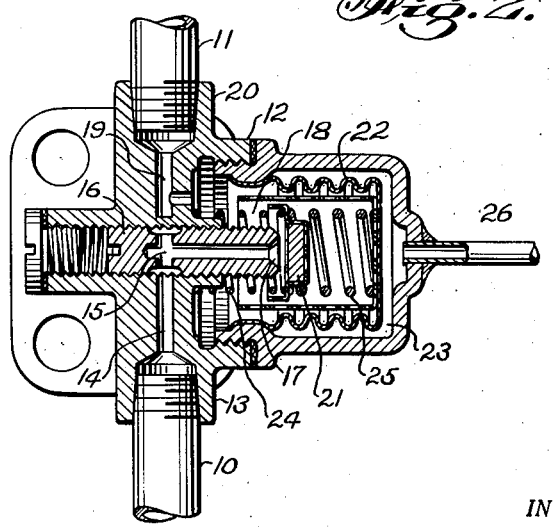
INVENTOR.
J. G. Tandberg
BY
ATTORNEY Patented Oct. 11, 1932

1,881,978

UNITED STATES PATENT OFFICE

JOHN GUDBRAND TANDBERG, OF STOCKHOLM, SWEDEN, ASSIGNOR, BY MESNE ASSIGNMENTS, TO ELECTROLUX SERVEL CORPORATION, OF NEW YORK, N. Y., A CORPORATION OF DELAWARE

TEMPERATURE CONTROL APPARATUS

Application filed February 17, 1931, Serial No. 516,303, and in Germany August 20, 1930.

This invention relates to the treatment of substances to prevent a delay when changing from one state of consistency or phase to another responsive to variations in temperature.

It is well known that the change in phase does not occur at the temperature and pressure where it should occur for all substances, as, for instance, under certain conditions, water may be sub-cooled at atmospheric pressure to −10° C. and below without freezing, and vapors may be cooled below their normal condensation temperatures. This delay in the change of phase cannot be controlled very closely, as, for instance, the temperature to which water may be sub-cooled is often dependent on very small disturbances such as agitation or the presence of solid particles, so that it cannot be predetermined at what temperature freezing will occur. This also applies to the change from the gaseous to liquid phase by other substances.

This delay in change of state is especially undesirable in the control of temperatures by means of a thermostat which contains water and which obtains its governing impulse at the temperature at which freezing of the water occurs. The sub-cooling of the water makes the thermostat very unreliable. If the temperature of a refrigerator is to be controlled by a thermostat of this type the temperature of the medium to be cooled may become so low that damage such as the breaking of bottles or the freezing of foodstuffs may occur.

The object of this invention is to reduce or eliminate the delay in the change of phase so that the temperature at which the change should occur is not appreciably variant.

In the accompanying drawing Figure 1 shows a freezing water thermostat; and

Figure 2 is a section taken on line 2—2 in Figure 1.

Referring more particularly to Figure 2, the thermostat is adapted to control the flow of fluid through a line 10—11 which may be a refrigerant supply line to the cooling element of a refrigerating system. Fluid from pipe 10 connected to the casing 12 at the boss 13 flows through passage 14 in the casing and passage 15 in the adjustable member 16 to the valve opening 17 in the chamber 18 and from thence through passage 19 in casing 12 to the pipe 11 connected to the casing at boss 20. A valve member 21 is adapted to open and close the valve opening responsive to the movement of a sylphon bellows 22 which divides the interior of the casing 12 into a chamber 18 and an outer chamber 23. The bellows 22 is normally retained in its expanded position by springs 24 and 25 between which the valve member 21 is suspended thus maintaining the valve 17 normally open.

The outer chamber 23 communicates through pipe 26 with a fluid tight vessel or bulb 27 which is filled with an operating fluid such as water. This bulb is located in heat exchange relation with the medium the temperature of which is to be controlled. When the temperature falls below the freezing point of the water in bulb 27 a pressure is set up due to the expansion of the freezing water which pressure is transmitted through pipe 26 to chamber 23 and acts on the exterior of the sylphon bellows contracting the latter to close valve 17.

This type of thermostat is well known in the art but is of little practical use due to the uncertainty of its action on account of the sub-cooling of the water in the bulb as set forth above.

In acccordance with this invention the substance which it is desired shall change phase at a predetermined temperature, in this case the water contained in the bulb, is subjected to radio active rays, particularly alpha and beta rays. It has been found that in the presence of these rays practically no delay in change of phase occurs.

The water may be subjected to such rays in any desired manner, but probably the simplest way is to place in the bulb a radioactive substance such as uranium oxide, thorium salts, or the like. The radio-active material may be either soluble or insoluble in the working substance.

It will be obvious to those skilled in the art that various modifications may be made without departing from the spirit of the invention and therefore the invention is not limited to what is described in the specification but only as indicated in the appended claims.

I claim:

1. In a thermostatic device containing a working substance which undergoes a change in volume on fusion, a radio-active substance composing an element of the working substance.

2. In a thermostat containing water as the working substance and operable responsive to the freezing of the water, a radio-active substance in solution with the water.

3. In a thermostat comprising an expansible element and a sensitive bulb in communication with said element and containing water, a radio-active substance contained in said bulb.

4. In a thermostat comprising an expansible element and a communicating sensitive bulb containing a working substance which undergoes a change in volume on fusion, a radio-active material located within the working substance.

5. In a thermostat containing a working substance which undergoes a change in volume on fusion, a radio-active material located in the working substance.

6. In a fusion type thermostat containing water as the working medium a quantity of uranium oxide located in the water.

7. A fusion type thermostat containing water as the working substance and a radio-active material located in the water.

In testimony whereof I affix my signature.

JOHN GUDBRAND TANDBERG.